United States Patent
Kaneko (10) Patent No.: US 9,283,841 B2
(45) Date of Patent: Mar. 15, 2016

(54) FUEL PUMP DEVICE FOR VEHICLE ENGINES

(71) Applicant: SUZUKI MOTOR CORPORATION, Shizuoka (JP)

(72) Inventor: Hiroyuki Kaneko, Shizuoka (JP)

(73) Assignee: SUZUKI MOTOR CORPORATION, Shizuoka (JP)

( * ) Notice: Subject to any disclaimer, the term of this patent is extended or adjusted under 35 U.S.C. 154(b) by 529 days.

(21) Appl. No.: 13/751,248

(22) Filed: Jan. 28, 2013

(65) Prior Publication Data

US 2013/0213723 A1 Aug. 22, 2013

(30) Foreign Application Priority Data

Feb. 17, 2012 (JP) .................................. 2012-033048

(51) Int. Cl.
| | | |
|---|---|---|
| *F02M 37/06* | (2006.01) | |
| *F02M 39/02* | (2006.01) | |
| *B60K 15/00* | (2006.01) | |
| *F02M 37/04* | (2006.01) | |

(52) U.S. Cl.
CPC .............. *B60K 15/00* (2013.01); *F02M 37/043* (2013.01); *F02M 37/06* (2013.01); *F02M 39/02* (2013.01); *F02M 2200/03* (2013.01); *F02M 2200/185* (2013.01)

(58) Field of Classification Search
CPC . B60K 15/00; F02M 2200/03; F02M 37/043; F02M 37/06; F02M 39/02
See application file for complete search history.

(56) References Cited

U.S. PATENT DOCUMENTS 6,484,342 B2 * 11/2002 Takasaki et al. ............... 123/495
2011/0030649 A1 2/2011 Nagao

FOREIGN PATENT DOCUMENTS

| CN | 101555848 A | 10/2009 |
|---|---|---|
| CN | 101737216 A | 6/2010 |
| EP | 1 515 007 A1 | 3/2005 |
| JP | 2007-177713 A | 7/2007 |
| JP | 2008-19842 A | 1/2008 |

(Continued)

OTHER PUBLICATIONS

Official Action mailed Jun. 5, 2014 in corresponding DE Application No. 10 2013 201 956.4, filed Feb. 6, 2013 (with an English translation) (14 pages).

(Continued)

*Primary Examiner* — Lindsay Low
*Assistant Examiner* — Jacob Amick
(74) *Attorney, Agent, or Firm* — Rothwell, Figg, Ernst & Manbeck, P.C.

(57) ABSTRACT

A fuel pump device is installed in an engine compartment of a vehicle. The engine is placed in the engine compartment with a crankshaft extending in the vehicle width direction. An in-vehicle component is placed at one side of the engine compartment in the vehicle width direction relative to the engine. In the fuel pump device, an attachment is mounted on an end of the top of a cam housing mounted on the upper surface of the cylinder head. The end of the top of the cam housing is located at the other side of the engine compartment in the vehicle width direction relative to the engine. The attachment is so inclined with respect to the vehicle longitudinal direction as to be directed obliquely backward and upward from the cam shaft member toward the engine hood and the dash panel.

3 Claims, 7 Drawing Sheets

(56) References Cited

FOREIGN PATENT DOCUMENTS

| JP | 2011-38431 A | 2/2011 |
| JP | 2012-2210 A | 1/2012 |

OTHER PUBLICATIONS

Office Action mailed Oct. 31, 2014 in corresponding Chinese Patent Application No. 201310025406.0 (with an English translation) (14 pages).

* cited by examiner

FUEL PUMP DEVICE FOR VEHICLE ENGINES

CROSS REFERENCE TO RELATED APPLICATIONS

This application is based on and claims the benefit of priority from Japanese Patent Application 2012-033048 filed on Feb. 17, 2012, the disclosure of which is incorporated in its entirety by reference.

TECHNICAL FIELD

The present invention relates to fuel pump devices for vehicle engines.

BACKGROUND

An example of various arrangements of a vehicle engine in its compartment covered with a hood is known in Japanese Patent Application Publication No. 2007-177713. In the known arrangement, an engine is installed in the compartment with the crankshaft located along the width direction of the vehicle. In the known arrangement, in-vehicle components including a battery and an air cleaner are placed in a first space in the engine compartment; the first space is ensured between the engine and one sidewall of the engine compartment in the vehicle width direction. In the known arrangement, a brake booster is placed in a second space in the engine compartment; the second space is ensured between the engine and the other sidewall of the engine compartment in the vehicle width direction.

An example of how fuel pump devices are mounted on engines is known in Japanese Patent Application Publication No. 2011-38431. In the known example, a fuel pump device including its housing is mounted on a side portion, i.e. a sidewall, of the external walls of the cylinder head of an engine; the side portion faces the axial direction of the cam shaft of the engine. Specifically, in the mount structure of the fuel pump device in the known example, the fuel pump device is mounted on an external wall of the cylinder head while being cantilevered.

SUMMARY

Because the housing of a fuel pump device is normally made of metal, a fuel pump device with its housing has a relatively heavy weight. Thus, the mount structure of such a fuel pump device in the known example may cause the fuel pump device to easily vibrate due to engine vibration. In addition, the cantilever structure of the fuel pump device may cause the cam shaft and the cylinder head to easily vibrate, and the fuel pump device and its components to have insufficient strength and rigidity.

Let us consider a case where the mount structure of the fuel pump device is applied to the known arrangement of an engine disclosed in the Patent Publication No. 2007-177713. In this case, because in-vehicle components including a battery and an air cleaner are placed in the first space ensured between the engine and one sidewall of the engine compartment in the vehicle width direction, the fuel pump device should be placed in the second space ensured between the engine and the other sidewall of the engine compartment in the vehicle width direction. This placement of the fuel pump device results in excessive projection of the fuel pump device from the corresponding sidewall of the cylinder head in the vehicle width direction. Thus, in this case where the mount structure of the fuel pump device is applied to the known arrangement of an engine disclosed in the Patent Publication No. 2007-177713, a large space is required as the second space between the engine and the other sidewall of the engine compartment in the vehicle width direction for placement of the fuel pump device therein. In order to ensure the large space between the engine and the other sidewall of the engine compartment in the vehicle width direction, it is necessary that the engine position should be more moved to the one sidewall of the engine compartment in the vehicle width direction. This necessity makes it difficult to ensure the sufficient volume of the first space between the engine and the one sidewall of the engine compartment in the vehicle width direction.

Thus, if the mount structure of the fuel pump device is applied to the known arrangement of an engine disclosed in the Patent Publication No. 2007-177713, it may be difficult to enlarge the volume of the in-vehicle components, such as the air cleaner and the battery, to be installed in the first space ensured between the engine and the one sidewall of the engine compartment in the vehicle width direction, resulting in reduction of the engine's intake capability and the battery capacity.

In view of the circumstances set forth above, one aspect of the present invention seeks to provide fuel pump devices for vehicle engines; these fuel pump devices are designed to address the problems set forth above.

Specifically, an alternative aspect of the present invention aims to provide such fuel pump devices, which are capable of ensuring the volumes of in-vehicle components installed around the respective engines, and reducing vibration.

A further aspect of the present invention aims to provide such fuel pump devices, which could protect the fuel pump devices even if external force were applied to the engine.

According to an exemplary aspect of the present invention, there is provided a fuel pump device. The fuel pump device is installed in an engine compartment of a vehicle, the top of which is covered with an engine hood. The vehicle includes an engine placed in the engine compartment with a crankshaft extending in a width direction of the vehicle, a dash panel placed at a rear end of the engine compartment, and at least one in-vehicle component placed at one side of the engine compartment in the width direction of the vehicle relative to the engine. The engine includes a cylinder head, a cam housing, and a cam shaft member. The cam housing is mounted on an upper surface of the cylinder head of the engine. The cam shaft member is rotatably installed in the cam housing, the fuel pump device being driven based on rotation of the cam shaft member. The fuel pump device includes a fuel pump for delivering fuel to the engine, and an attachment by which the fuel pump is attached to the cam housing. The attachment is mounted on an end of a top of the cam housing. The end of the top of the cam housing is located the other side of the engine compartment in the width direction of the vehicle relative to the engine. The fuel pump attached to the cam housing by the attachment is directed obliquely backward and upward from the cam shaft member toward the engine hood and the dash panel.

In a first example of the exemplary aspect of the present invention, the cam shaft member includes a front cam shaft extending in the width direction of the vehicle, and a rear cam shaft extending in the width direction of the vehicle. The front cam shaft is closer to the front side of the engine compartment in the longitudinal direction of the vehicle than the rear cam shaft is. The fuel pump has a bottom in a length direction thereof, and comprises a movable member located at the bottom of the fuel pump to be movable in a predetermined direction for drive of the fuel pump. The attachment is mounted on the end of the top of the cam housing such that the predetermined direction of the movable member is directed to the front cam shaft.

In a second example of the exemplary aspect of the present invention, the attachment is provided astride a first portion of the cam housing located above the front cam shaft and a second portion of the cam housing located above the rear cam shaft to join the first portion and the second portion of the cam housing.

In a third example of the exemplary aspect of the present invention, the at least one in-vehicle component is plural in-vehicle components including an air cleaner and a battery.

In a fourth example of the exemplary aspect of the present invention, the cam housing includes a journal bearing mounted on the cylinder head to rotatably support a lower side of the cam shaft member, a frame fixedly mounted on a peripheral end of the upper surface of the cylinder head, and a cam cap provided above the journal bearing to rotatably support an upper side of the cam shaft member. The attachment is integrally formed with the cam housing.

The configuration of the fuel pump device according to the exemplary aspect prevents the fuel pump from projecting from a sidewall of the cylinder head; the sidewall corresponds to the other side of the engine compartment in the vehicle width direction relative to the engine. Thus, the configuration of the fuel pump device results in elimination of the need to ensure a large space at the other side of the engine compartment in the vehicle width direction relative to the engine. This maintains the position of the engine at a substantially center portion of the engine compartment in the vehicle width direction. In comparison to a case where the engine is located at the one side of the engine compartment in the vehicle width direction so that a space located at the one side of the engine compartment in the vehicle width direction relative to the engine is narrow, the characteristics of the fuel pump device make it possible to sufficiently ensure the volume of the at least one in-vehicle component to be installed in the space located at the one side of the engine compartment in the vehicle width direction relative to the engine, and reduce vibrations. In addition, the fuel pump device could protect the fuel pump device itself even if external force were applied to the engine.

BRIEF DESCRIPTION OF THE DRAWINGS

Other aspects of the present invention will become apparent from the following description of embodiments with reference to the accompanying drawings in which.

DETAILED DESCRIPTION OF EMBODIMENT

Fuel pump devices for vehicle engines according to an embodiment of the present invention, which will be referred to simply as engines, will be described hereinafter with reference to the accompanying drawings. In this embodiment, the longitudinal direction, i.e. the forward-rearward direction, the width direction, i.e. the left-right direction, and the vertical direction, i.e. the height direction, of a corresponding vehicle are illustrated by respective arrows.

Figure 1:
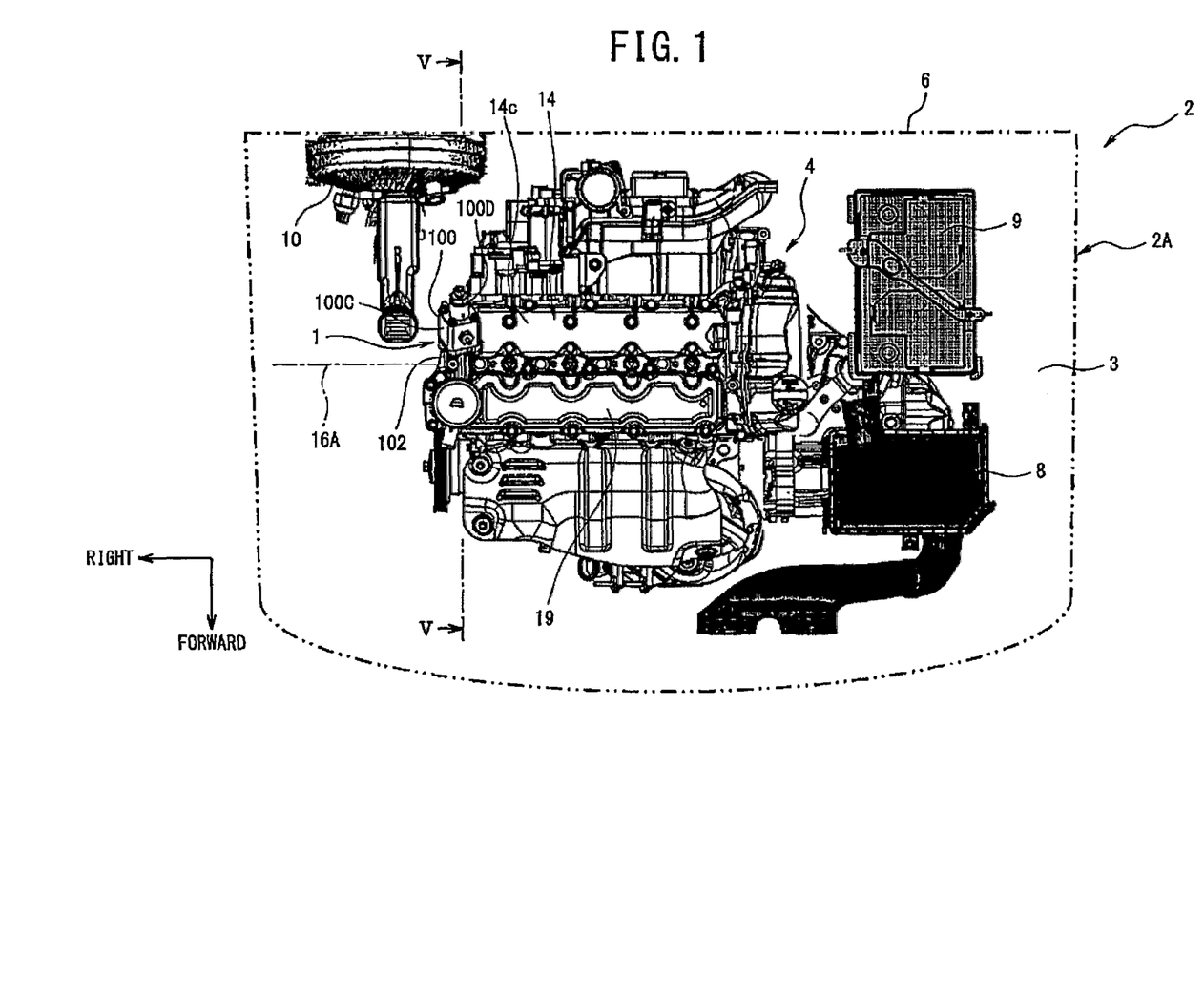
FIG. 1 is a plan view of a front portion of a vehicle, which includes an engine equipped with a fuel pump device therefor according to an embodiment of the present invention.
Figure 2:
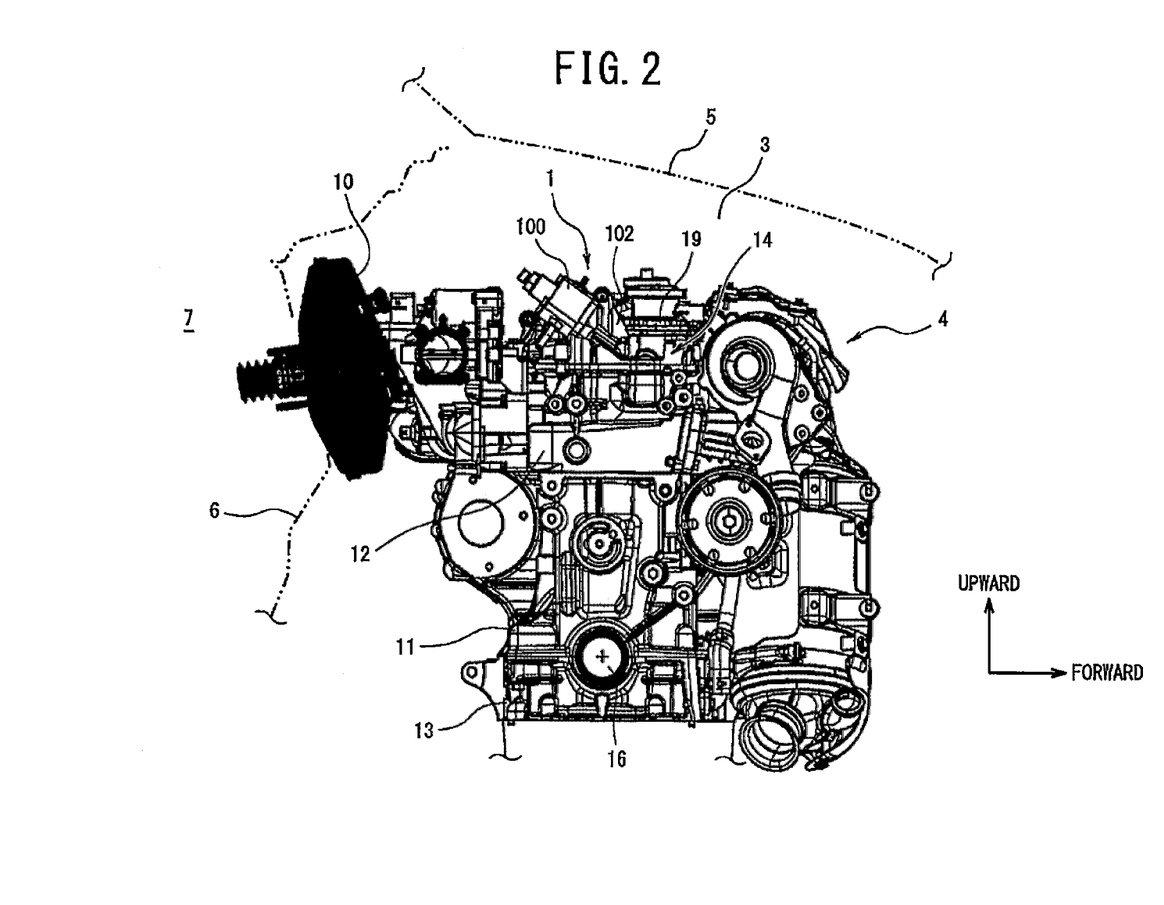
FIG. 2 is a side view of the front portion of the vehicle in which the fuel pump device according to the embodiment is installed, as viewed from the right of the front portion in a vehicle width direction.

Referring to FIG. 1, the body of a vehicle 2 is provided at its front portion 2A with an engine compartment 3. A fuel pump device 1 according to this embodiment is mounted on an engine 4 installed in the engine compartment 3. Referring to FIG. 2, the top of the engine 4 is covered with an engine hood 5. The rear end of the engine compartment 3 is separated from a cabin 7 by a dash panel 6 located at a rear end of the engine compartment 6 in the longitudinal direction of the vehicle. Referring to FIG. 1, an air cleaner 8 and a battery 9 as in-vehicle components are so installed in the engine compartment 3 as to be placed at one side, i.e. the left, of the engine compartment 3 in the vehicle width direction relative to the engine 3. A brake booster 10 is so installed in the engine compartment 3 as to be placed at the other side, i.e. the right, of the engine compartment 3 in the vehicle width direction relative to the engine 4. That is, the brake booster 10 is arranged between the engine 4 and the dash panel 6 in the vehicle width direction.

Referring to FIG. 2, the engine 4 is comprised of a cylinder block 11, a cylinder head 12, a lower crankcase 13, a cam housing 14, and a cylinder head cover 19. The cylinder head 12 is mounted on the top of the cylinder block 11, and the lower crankcase 13 is mounted on the bottom of the cylinder block 11. The cam housing 14 is mounted on an upper surface of the cylinder head 12. For example, referring to FIG. 3, a first cylinder #1, a second cylinder #2, a third cylinder #3, and a fourth cylinder #4 are aligned in a straight line. The cylinder head 12 covers the tops of the cylinders 1# to 4#. In the cylinder head 12, a pair of intake valves and a pair of exhaust valves (not shown) are formed at predetermined positions corresponding to each of the cylinders #1 to #4.

As illustrated in FIG. 2, the lower crankcase 13 constitutes the bottom of the cylinder block 11. Specifically, in each of the cylinders #1 to #4, a piston (not shown) is disposed to reciprocate. The top of the piston in each of the cylinders #1 to #4 constitutes a combustion chamber of a corresponding one of the cylinders #1 to #4. The bottom of the piston in each cylinder is coupled to a crankshaft 16 via a connecting rod. The crankshaft 16 is rotatably supported in the inside of the lower crankcase 13 and the inside of the cylinder block 11. That is, the reciprocating motion of the piston in each cylinder is converted into rotary motion of the crankshaft, and the rotary motion of the crankshaft 16 is outputted as rotary power of the engine 4. As illustrated in FIG. 1, the engine 4 is disposed in the engine compartment 3 with the axial line 16A of the crankshaft 16 extending in the vehicle width direction.

Figure 3:
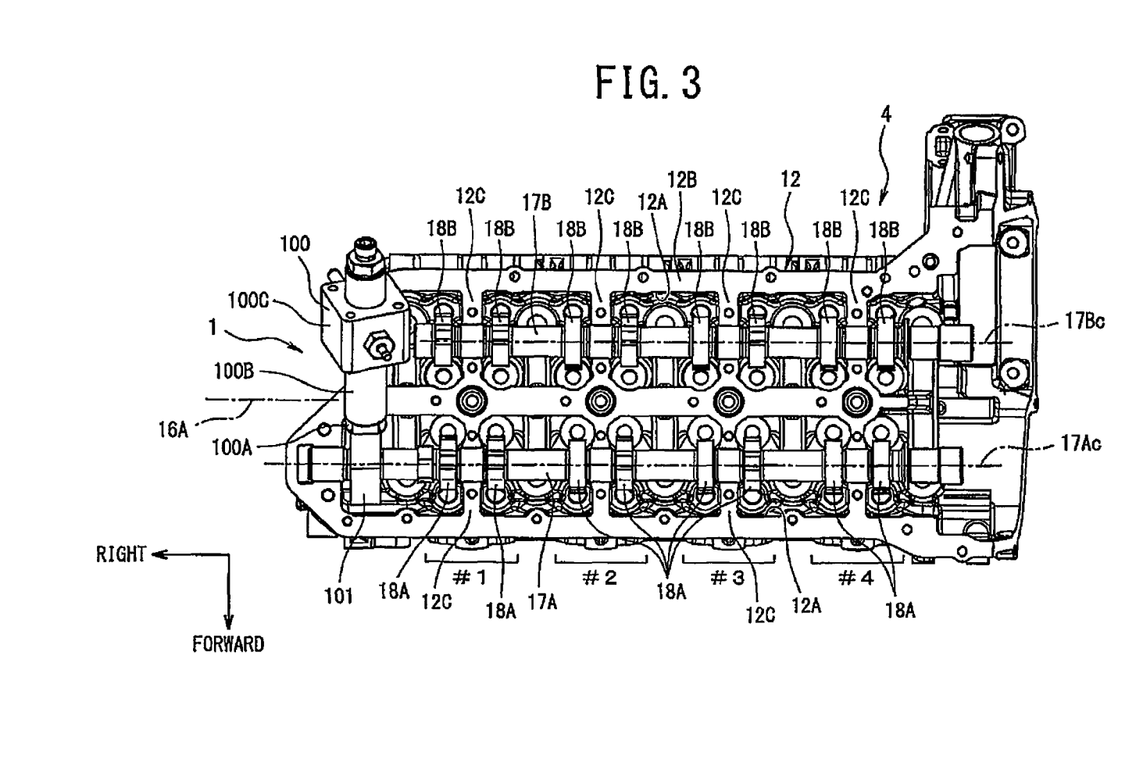
FIG. 3 is a plan view of the vehicle engine from which a cylinder head cover and a cam housing have been removed from the vehicle engine according to the embodiment.
Figure 4:
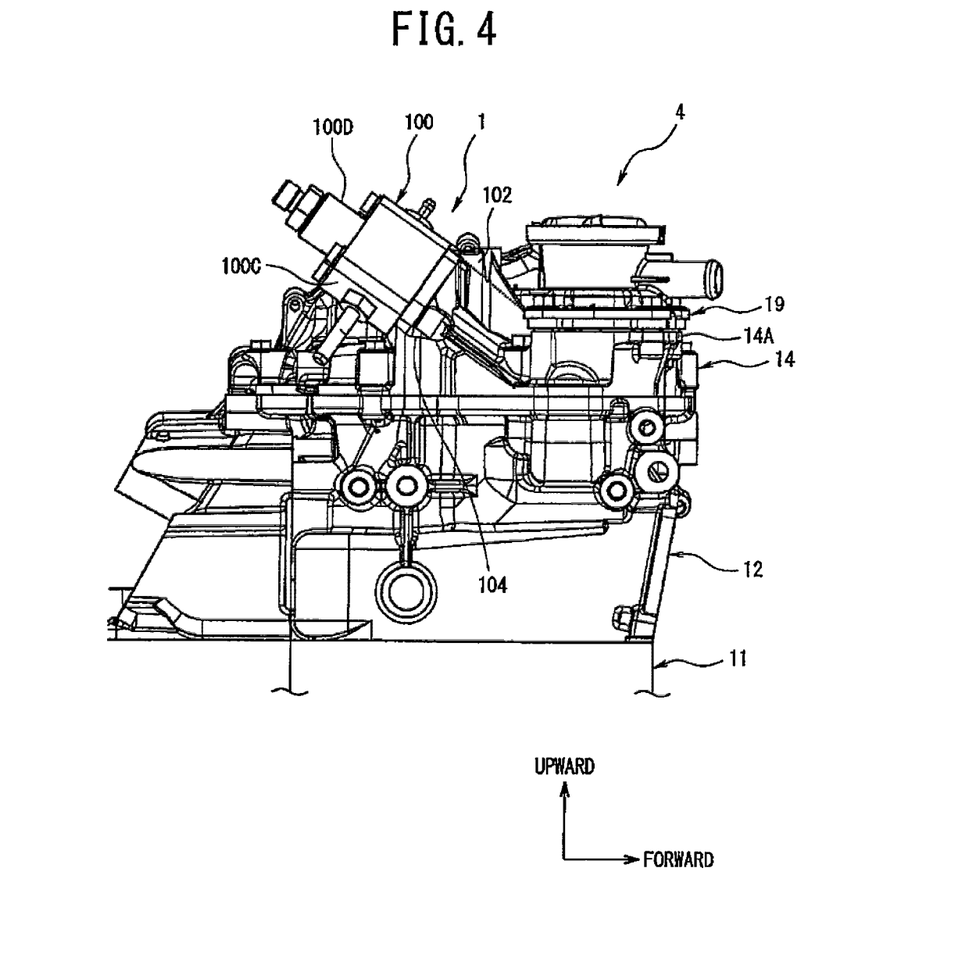
FIG. 4 is a side view of the vehicle engine and its periphery.
Figure 6:
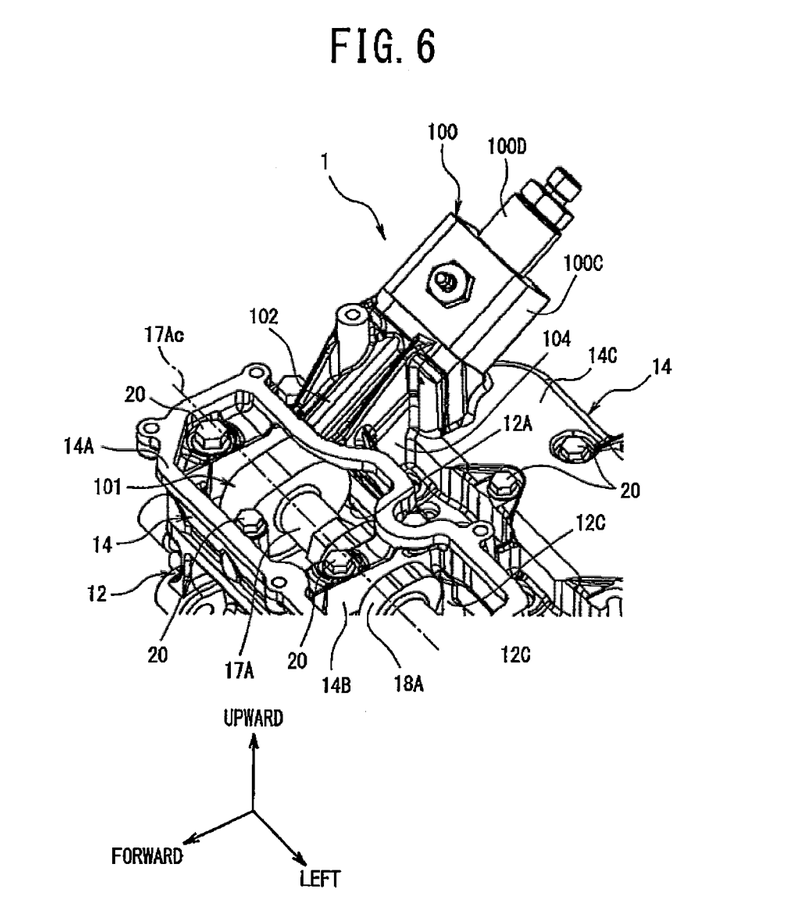
FIG. 6 is a perspective view of the fuel pump device according to the embodiment and its periphery.

As illustrated in FIGS. 3 and 6, a cam chamber 12A is so formed in an upper surface of the cylinder head 12 as to be concaved downward as a groove. That is, the cam chamber 12A is comprised of a peripheral wall 12B projecting upward from the peripheral portion of the upper surface of the cylinder head 12. In other words, the peripheral wall 12B defines the cam chamber 12A therein.

In addition, the cam chamber 12A is partitioned by a partitioning wall portion into first and second cam chambers 12A located to be parallel to the axial line 16A of the crankshaft 16. In the respective first and second cam chambers 12A, a front cam shaft 17A serving as an exhaust cam shaft and a rear cam shaft 17B serving as an intake cam shaft are installed such that their axial lines 17Ac and 17Bc are parallel to the axial line 16A of the crankshaft 16. A plurality of journal bearings 12C are formed on a part of the upper surface of the cylinder head 12 located in each of the first and second cam chambers 12A. The lower half of the outer peripheral surface of each of the front and rear cam shafts 17A and 17B is supported by the plurality of journal bearings 12C located in a corresponding one of the first and second cam chambers 12A such that the front and rear cam shafts 17A and 17B are rotatable.

The housing 14 is mounted on the first and second cam chambers 12A such that the front and rear cam shafts 17A and 17B are rotatable. Referring to FIG. 3, the front cam shaft 17A is equipped with a plurality of cams 18A mounted thereon in the axial direction thereof. The plurality of cams 18A drive the exhaust valves via rocker arms (not shown) to open or close an exhaust port of a corresponding cylinder for allowing exhaust gas due to combustion of an air-fuel mixture in the combustion chamber to be outputted from the combustion chamber via the exhaust port into an exhaust manifold.

Similarly, the rear cam shaft 17B is equipped with a plurality of cams 18B mounted thereon in the axial direction thereof. The plurality of cams 18B drive the intake valves via rocker arms (not shown) to open or close an intake port of a corresponding cylinder for allowing fresh air from an intake manifold to be introduced into the combustion chamber via the intake port.

In this embodiment, a drive cam 101 is mounted on one end of the front cam shaft 17A in the vehicle width direction for driving the fuel pump device 1; the one end of the front cam shaft 17A corresponds to the other side, i.e. the right, of the engine compartment 3 in the vehicle width direction relative to the engine 4.

Referring to FIG. 6, the cam housing 14 is provided with a frame 14A mounted on the peripheral wall 12B. The frame 14A has a top open surface that opens an upper side of the first cam chamber 12A in which the front cam shaft 17A is installed. A plurality of cam caps 14B are provided above the plurality of journal bearings 12C formed on the part of the upper surface of the cylinder head 12. Specifically, each of the plurality of cam caps 14B is hung between first and second portions of the frame 14A; these first and second portions are opposite to each other in the longitudinal direction of the vehicle. Each of the plurality of cam caps 14B is designed to support the upper half of the outer peripheral surface of each of the front and rear cam shafts 17A and 17B.

Above the first cam chamber 12A in which the front cam shaft 17A is installed, a cylinder head cover 19 is placed. The cylinder head cover 19 is fixed to the cam housing 14.

A top plate 14C is mounted on the peripheral wall 12B for the second cam chamber 12B and the partitioning wall portion, thus closing the cam chamber 12A in which the rear cam shaft 17B has been installed.

In this embodiment, an attachment 102 used to attach the fuel pump device 1 to the cam housing 14 is integrally formed with the cam housing 14. Specifically, the attachment 102 is located at a rear-side surface of the other-side end, i.e. the right end, of the cam housing 14 in the vehicle width direction. In addition, as illustrated in FIG. 6, the cam housing 14 mounted on the upper surface of the cylinder head 12 is threadedly fixed thereto by bolts 20.

Referring to FIG. 6, the fuel pump device 1 according to this embodiment is comprised of the drive cam 101, the attachment 102, and a fuel pump 100. As the fuel pump device 1, a high-pressure fuel pump device can be used.

Figure 5:
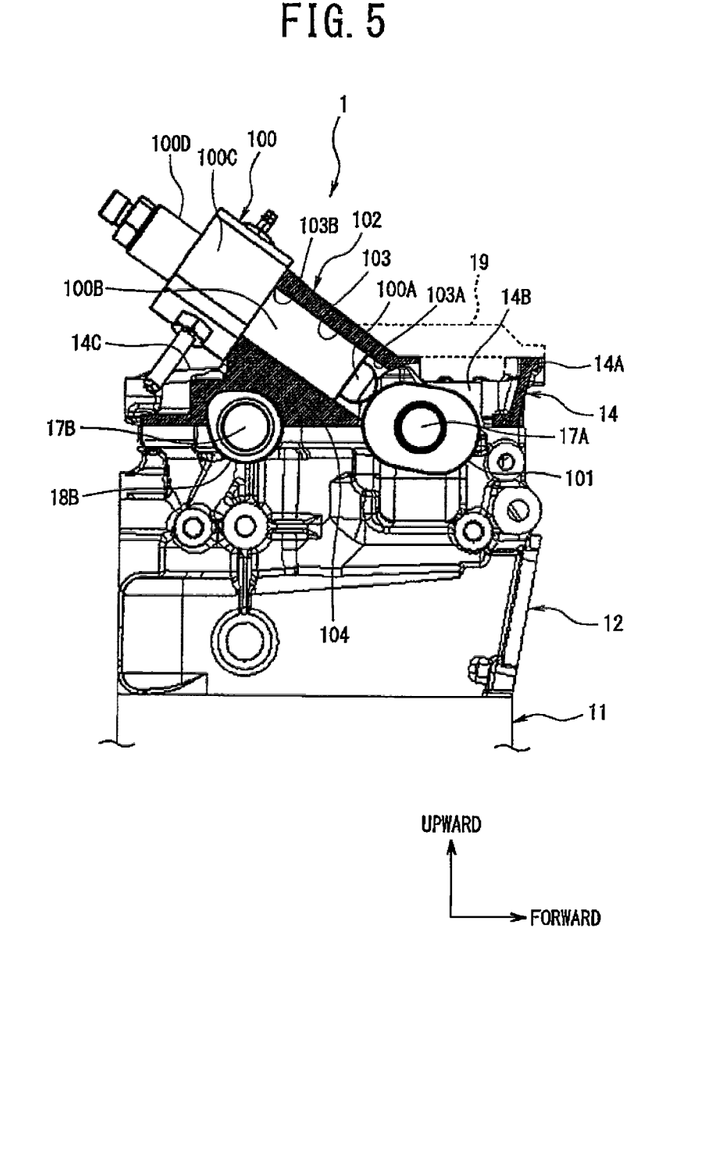
FIG. 5 is a sectional view taken on line V-V in FIG. 1.

Referring to FIGS. 5 and 6, the drive earn 101 has a substantially elliptic cylindrical shape, in other words, having a substantially elliptical shape in its lateral cross section. Thus, the drive cam 101 has at its outer periphery a cam surface having a substantially elliptical profile. The one end, i.e. the right end, of the front cam shaft 17A penetrates through the center portion of the drive cam 101, so that the drive cam 101 is fixed to the front cam shaft 17A. The profile of the cam surface of the drive cam 101 can be varied according to the characteristics of the fuel pump 100.

Next, an example of the configuration of the attachment 102 will be described hereinafter with reference to mainly FIGS. 5 and 6.

As illustrated in FIG. 5, the attachment 102 is provided astride a first portion of the cam housing 14 located above the one end (right end) of the front cam shaft 17A and a second portion of the cam housing 14 located above one end (right end) of the rear cam shaft 17B. That is, the attachment 102 joins the first portion and the second portion of the cam housing 14.

In addition, the attachment 102 is provided with a tubular housing defining an installation hole 103 therein. The installation hole 103 is formed in the attachment 102 to penetrate therethrough. Specifically, the installation hole 103 has a front open end 103A and a rear open end 103B opposing thereto; the front open end 103A is directed to the cam surface of the drive cam 101 for the front cam shaft 17A. That is, as illustrated in FIG. 5, the installation hole 103 is so inclined with respect to the longitudinal direction of the vehicle as to be directed obliquely backward and upward. A lower portion of the tubular housing of the attachment 102 located below the rear open end 103B has a thickness in the vertical direction greater than that of a lower portion of the tubular housing located below the front open end 103A; the lower portion of the tubular housing serves as a reinforcement 104 of the joint between the first portion and the second portion of the cam housing 14 in the longitudinal direction of the vehicle.

Referring to FIG. 5, the fuel pump 100 is comprised of a movable member, i.e. lifter, 100A, an insertion portion 100B, a control portion 100C, and a coupler 100D. The fuel pump 100 has a top and bottom in its length direction. The lifter 100A is located at the bottom of the fuel pump to abut on the cam surface of the drive can 101 and configured to reciprocate in the axial direction, that is, the longitudinal direction of the insulation hole 103. The insertion portion 100B includes a plunger, one end of which is coupled to the top of the lifter 100A. The plunger is designed to reciprocate in the axial direction of the insertion hole 103 as the lifter 100A reciprocates. The control portion 100C includes a control valve, a check valve, a compression chamber, and one or more other members required to control the fuel pump 100. The coupler 100D is communicably coupled to a fuel tank (not shown) installed in the vehicle via a pipe (not shown).

For example, the other end of the plunger is inserted in the compression chamber in which fuel is introduced from the fuel tank via the pipe and coupler. The check valve is communicably coupled to the compression chamber and to a high-pressure passage communicably coupled to an injector for each cylinder.

For example, operations of the fuel pump 100 are as follows. Specifically, the lifter reciprocates according to rotation of the drive cam 101 (first cam shaft 17A), and the plunger reciprocates according to reciprocation of the lifter 100A.

Reciprocation of the plunger compresses the fuel stored in the compression chamber, and when the pressure of the compressed fuel is higher than the pressure of fuel in the high-pressure passage, the check valve is opened, so that compressed fuel is delivered via the check valve and the high-pressure passage to the injector for injection of fuel into the compression chamber of each cylinder.

Specifically, referring to FIG. 5, the fuel pump 100 according to this embodiment is configured such that the insertion portion 100B is fitted in the installation hole 103 of the attachment 102 with the lifter 100A slidably abutting on the cam surface of the drive cam 101. Thus, as illustrated in FIG. 2, installation of the fuel pump 100 in the attachment 102 during assembly of the fuel pump device 1 results in fixation of the fuel pump 100 to the attachment 102 while the fuel pump 100 is so inclined with respect to the longitudinal direction of the vehicle as to be directed obliquely backward and upward.

As described above, the fuel pump device 1 according to this embodiment is mounted on the cam housing 14 mounted on the top of the cylinder head 12 in the engine compartment 3 while the fuel pump 100 is so inclined with respect to the upper surface of the cylinder head 12 of the vehicle as to be directed obliquely backward and upward. The configuration of the fuel pump device 1 prevents the fuel pump 100 from projecting from a sidewall of the cylinder head 12; the sidewall corresponds to the other side, i.e. the right, of the engine compartment 3 in the vehicle width direction relative to the engine 4. Thus, the configuration of the fuel pump device 1 results in elimination of the need to ensure a large space at the other side of the engine compartment 4 in the vehicle width direction relative to the engine 3 for installation of the fuel supply device 1 therein. In other words, the configuration of the fuel pump device 1 results in elimination of the need to ensure a large space between the engine 4 and the right sidewall of the engine compartment 3 in the vehicle width direction. This sufficiently ensures a space located at the one side of the engine compartment 3 in the vehicle width direction relative to the engine 4, in other words, a space between the engine 4 and the left sidewall of the engine compartment 3 in the vehicle width direction. This makes it possible to maintain the position of the engine 4 at a substantially center portion of the engine compartment 3 in the vehicle width direction.

Thus, in comparison to a case where the engine 4 is located to be close to the left sidewall of the engine compartment 3 so that a space located at the one side of the engine compartment 3 in the vehicle width direction relative to the engine 4 is narrow, the characteristics of the fuel pump device 1 make it possible to more enlarge the volume of in-vehicle components including the air cleaner 8 and the battery 9 to be installed in the space located at the one side of the engine compartment 3 in the vehicle width direction relative to the engine 4, thus improving the engine's intake capability and the battery capacity.

Figure 7:
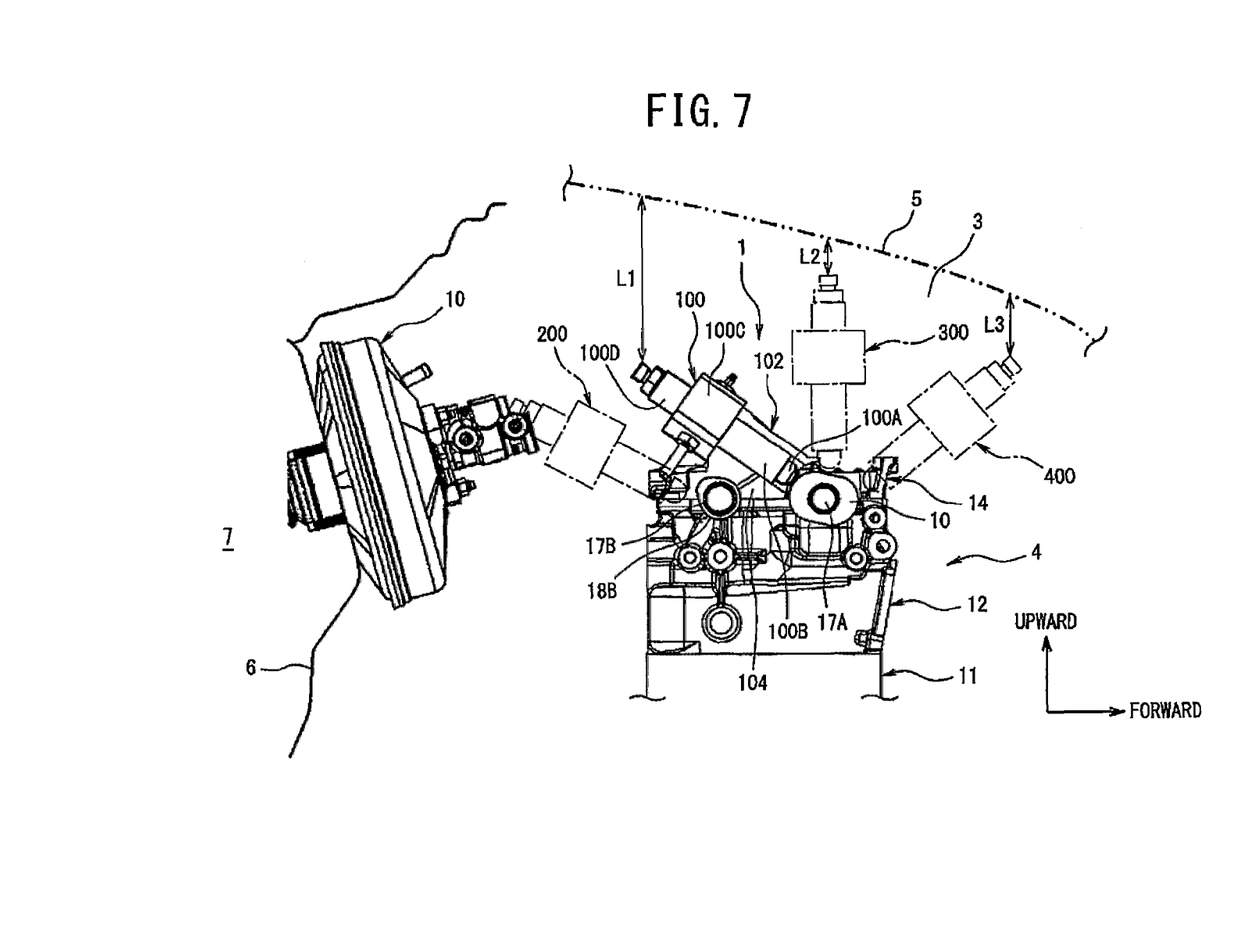
FIG. 7 is a side view of the front portion of the vehicle in which the fuel pump device according to the embodiment is installed, as viewed from the right of the front portion in the vehicle width direction, which includes various comparative examples of the fuel pump device according to the embodiment.

Referring to FIGS. 2 and 7, the engine hood 5 is normally so inclined with respect to the longitudinal direction of the vehicle as to gradually increase in height from its front end to its rear end.

If a fuel pump 200 as a first comparison example of this embodiment is so placed as to be directed obliquely backward and upward with respect to the rear cam shaft 17B (see a dashed-dotted line in FIG. 7), the fuel pump 200 may interfere with the brake booster 10.

A fuel pump 300 as a second comparison example of this embodiment is so placed as to be directed upward above the front cam shaft 17A (see a dashed-dotted line in FIG. 7), and a fuel pump 400 as a third comparison example of this embodiment is so placed as to be directed obliquely frontward and upward with respect to the front cam shaft 17A (see a dashed-dotted line in FIG. 7).

However, in each of the second and third comparison examples, if an object abutted on the engine hood 5, the engine hood 5 could significantly interfere with a corresponding one of the fuel pumps 300 and 400, resulting in reduction of the amount of deformation of the engine hood 5.

In contrast, as illustrated in FIG. 7, the fuel pump 100 according to this embodiment is so inclined with respect to the upper surface of the cylinder head 12 of the vehicle as to be directed obliquely backward and upward with respect to the front cam shaft 17A. This inclination results in ensuring of a long clearance L1 between the engine hood 5 and the top, i.e. the coupler 100D, of the fuel pump 100 in the vertical direction. This arrangement of the fuel pump 100 could increase the amount of deformation of the engine hood 5 even if an object contacted the engine hood 5. Thus, it is possible to prevent the engine hood 5 from significantly interfering with the fuel pump 100 even if an object contacted the engine hood 5, resulting in reduction of the impact of the contact on the object. In addition, the increase in the amount of deformation of the engine hood 5 when an object contacted the engine hood 5 could protect the fuel pump device 1 against the impact of the contact. Moreover, the arrangement of the fuel pump device 1 according to this embodiment prevents the fuel pump 100 from interfering with the brake booster 10. Thus, it is possible to enlarge the capacity of the brake booster 10, thus improving brake performance.

The attachment 102 for attachment of the fuel pump 100 to the cam housing 14 is integrally formed with the cam housing 14. In comparison to the structure that a fuel pump is attached to a sidewall of a cylinder head as a known example, the configuration of the fuel pump device 1 results in stable holding of the fuel pump 100 to the cylinder head 12. Thus, the fuel pump device 1 according to this embodiment reduces vibrations of the fuel pump device 1, especially the fuel pump 100.

Vibrations caused by rotations of the front and rear cam shafts 17A and 17B are usually transferred to the cam caps 14B, and thereafter to the cam housing 14 and the cylinder head 12.

Thus, if a fuel supply device has an identical configuration of the fuel supply device 1 but includes no characteristics of the fuel supply device 1 according to this embodiment, the transfer of the vibrations may cause a portion of the cam housing 14 between the front cam shaft 17A and the rear cam shaft 17B to easily vibrate, which may cause the whole of the cam housing 14 to be easily deformed.

In contrast, the fuel pump device 1 according to this embodiment is configured such that the attachment 102 is integrally formed with the cam housing 14. This configuration enables the reinforcement 104 as a part of the attachment 102 to be formed close to each of the front and rear cam shafts 17A and 17B (see FIG. 5). Because the reinforcement 104 is provided beneath the fuel pump 100 inclined with respect to the cam housing 14, the reinforcement 104 serves as a relatively thick rib of the cam housing 14, resulting in increase of the rigidity of the cam housing 14. The increase in the rigidity of the cam housing 14 allows the attachment 102 to serve as a reinforcement to reduce deformation of the cam housing 14. The increase in the rigidity of the cam housing 14 also reduces deformation of each of the front and rear cam shafts 17A and 17B and the cylinder head 12, thus reducing vibrations of the cylinder head 12 and/or the front and rear cam shafts 17A and 17B.

The fuel pump device 1 according to this embodiment has been described, but the descriptions and figures of which are not limited to the present invention. Skilled persons in the art could derive, from the descriptions and figures of the fuel pump device 1 according to this embodiment, various alternative embodiments, other embodiments, and operational techniques. For example, the engine 4 according to this embodiment, to which the present invention is applied, is designed such that four cylinders are aligned in a straight line, but the present invention can be applied to various engines each including a cam shaft attached to the cylinder head.

While an illustrative embodiment of the present disclosure has been described herein, the present disclosure is not limited to the embodiment described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. A fuel pump device installed in an engine compartment of a vehicle, a top of which is covered with an engine hood, the vehicle including an engine placed in the engine compartment with a crankshaft extending in a width direction of the vehicle, a dash panel placed at a rear end of the engine compartment, and at least one in-vehicle component placed at one side of the engine compartment in the width direction of the vehicle relative to the engine, the engine including a cylinder head, a cam housing, a front cam shaft member, and a rear cam shaft member, the cam housing being mounted on an upper surface of the cylinder head of the engine, the front cam shaft member being rotatably installed in the cam housing and extending in the width direction of the vehicle, the rear cam shaft member being located at a rear side of the vehicle and extending in the width direction of the vehicle, the fuel pump device being driven based on rotation of the front cam shaft member, the fuel pump device comprising:

a fuel pump for delivering fuel to the engine, the fuel pump having a bottom in a length direction thereof and comprising a movable member located at the bottom of the fuel pump to be movable in a predetermined direction for drive of the fuel pump; and an attachment by which the fuel pump is attached to the cam housing, the attachment being mounted on an end of a top of the cam housing, the end of the top of the cam housing being located at the other side of the engine compartment in the width direction of the vehicle relative to the engine, the attachment being provided astride a first portion of the cam housing located above the front cam shaft member and a second portion of the cam housing located above the rear cam shaft member, the attachment comprising:

an installation hole in which at least part of the fuel pump is installed; and a reinforcement extending downward from the installation hole and joining between the first portion and the second portion of the cam housing in the longitudinal direction of the vehicle, the fuel pump attached to the cam housing by the attachment being directed obliquely backward and upward from the cam shaft member toward the engine hood and the rear cam shaft member while the predetermined direction of the movable member is directed to the front cam shaft member.

2. The fuel pump device according to claim 1, wherein the at least one in-vehicle component is plural in-vehicle components including an air cleaner and a battery.

3. The fuel pump device according to claim 1, wherein the cam housing comprises:

a journal bearing mounted on the cylinder head to rotatably support a lower side of the cam shaft member;

a frame fixedly mounted on a peripheral end of the upper surface of the cylinder head; and a cam cap provided above the journal bearing to rotatably support an upper side of the cam shaft member, wherein the attachment is integrally formed with the cam housing.

* * * * *